United States Patent
Perez

[15] 3,679,057
[45] July 25, 1972

[54] SCREEN FILTER PACK AND METHOD FOR MAKING SAME

[72] Inventor: Damasco Rodolfo Adelto Perez, 17 E. San Marino Ave., Alhambra, Calif. 91801

[22] Filed: Sept. 11, 1970

[21] Appl. No.: 71,300

[52] U.S. Cl. ................................210/223, 210/499
[51] Int. Cl. ..........................................B01d 35/06
[58] Field of Search..................210/222, 223, 486, 487, 499; 55/521, 525, 3, 100, 520, 482, 486; 261/112; 209/401

[56] References Cited

UNITED STATES PATENTS

| | | | |
|---|---|---|---|
| 3,025,963 | 3/1962 | Bauer | 55/521 |
| 3,112,184 | 11/1963 | Hollenbach | 55/521 |
| 3,386,227 | 6/1968 | Czerwonka | 55/521 X |
| 3,471,023 | 10/1969 | Rosaen | 210/223 |

Primary Examiner—Reuben Friedman
Assistant Examiner—T. A. Granger
Attorney—Smyth, Roston & Pavitt

[57] ABSTRACT

The filter is constructed of superimposed corrugated screens, each of which has a plurality of flattened areas of a predetermined width at the level of the apexes of the corrugations and extending transversely to the latter. One screen may be superimposed on another screen with its flattened areas in registry with those of the other screen, but with the flattened area of both screens being disposed most remotely from each other, so that the two screens define a plurality of passages of said predetermined width extending between each pair of screens and through the corrugations. Into these passage bars may be inserted for support of the screens. Such bars may be of a magnetizable material and magnetized to attract metallic particles in the gas or fluid to be filtered through the screen. Additional pairs of screens may be stacked upon the first pair to make up a filter pack.

7 Claims, 9 Drawing Figures

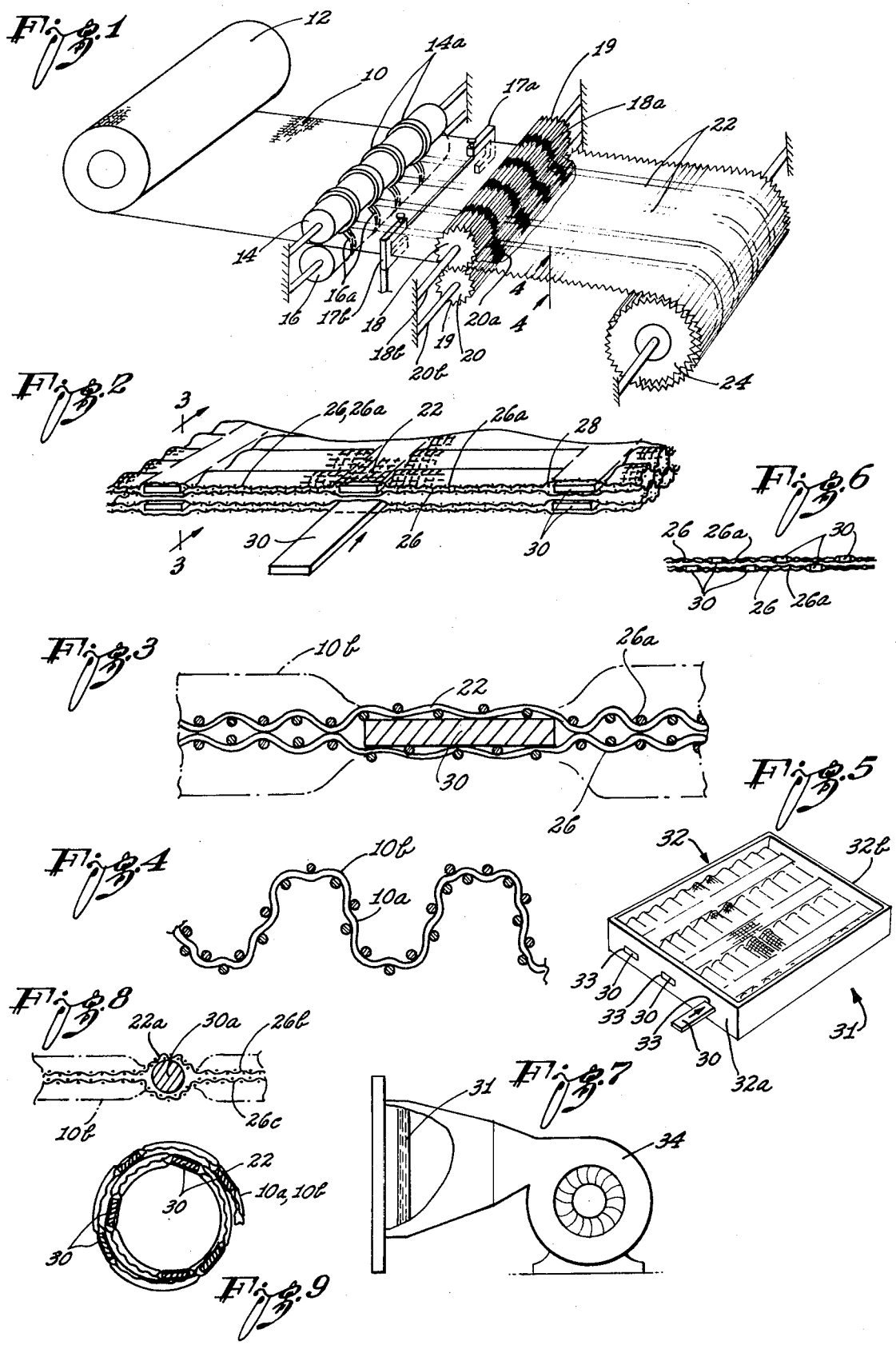

SCREEN FILTER PACK AND METHOD FOR MAKING SAME

BACKGROUND OF THE INVENTION

1. Field of the Invention

This invention relates to screen-type filters which are designed to filter pollutants out of liquids, air and other gases, and has particular use in filtering out ferrous metallic particles from such media. It also relates to apparatus for fabricating the special configuration of the screening which is employed in the screen filter pack of the present invention.

2. Description of the Prior Art

Screen filters have been employed for many years, as may be seen from the following patents:

| Patent No. | Inventor | Patent No. | Inventor |
| --- | --- | --- | --- |
| 1,566,088 | O. V. Greene | 2,567,030 | O. H. Schaaf |
| 2,405,716 | O. H. Schaaf | | |
| 2,443,238 | C. J. Glanzer | 3,310,177 | S. W. Briggs et al. |

In a number of these patents, as for example, those issued to Briggs, Greene, Schaaf and Glanzer, certain of the screens employed have been corrugated or pleated. However, in these patents, whenever corrugated screens are placed one on top of another, it has been necessary heretofore either to alternate the direction of the adjacent screens or to interpose layers of uncorrugated screens between the corrugated screens so that the corrugated screens will not nest closely together in their registering corrugations. Examples of the use of such expedients are found in the patents to Greene and Schaaf listed above. Screen filter packs made in the manner taught by these prior art patents, however, do not provide the most efficient flow passages for the fluid or gas being filtered since both the flat screens interposed between the corrugated sheets and the alternating disposition of such sheets tend to present obstacles to the fluid or gas flow. This affects not only the rate of filtration but also the ability of the user to clean the pack once it has been used. Moreover, such packs require more materials and labor to assemble them, thereby increasing their cost.

Where screen packs are of any substantial area, it is often desirable to provide some type of supporting elements to prevent the central area of the component screens from sagging under forces exerted by a fast flowing fluid. Such support has been provided in prior art screens by drawing the individual screen sheets taut and securing them peripherally to framing members; by alternating the direction of the corrugations of adjacent screens, and by providing supporting elements on the opposite side of the screen from that where the fluid flow enters, or between screen layers, such supporting elements being anchored in the side framing members. Supporting the screen packs in these ways has presented various difficulties, depending upon the size and use of the pack. Where the corrugations are small in pitch and the supporting elements are inserted along corrugation channels, the cross-sectional dimensions of the supporting elements are of necessity quite limited.

Although the patent to Sicard discloses a tubular filter having a magnet interposed along the flow path, the teaching of this patent is not readily applicable to flat screen filter packs of the type disclosed herein. Yet it may be highly desirable to provide means in a flat filter pack to attract out of a gas or fluid being filtered, ferrous metal particles which may be entrained in the fluid passing through the filter and which particles, if not removed, could damage machinery into which the fluid passes after being filtered, or otherwise be harmful.

Since no one has, to applicant's knowledge, fabricated screening in the configuration and for the purposes of the present invention, no machines have been devised for such fabrication.

SUMMARY OF THE INVENTION

The present invention provides a filter pack which does not require that the corrugations of adjacent screens be alternately directed at 90° angles in order to prevent nesting in registering corrugations; nor does it require the interposition of uncorrugated screens between adjacent corrugated screens to prevent such undesired nesting. This is because all corrugations may be in phase with each other and each screen has a plurality of transversely extending flattened areas which either abut registering flattened areas of adjacent screens, or, when reversed so as not to be in abutment, serve to receive supporting elements which prevent nesting in the valleys of the corrugations. This reception is made possible by disposing these flattened areas at the level of the apexes of the corrugations of screen so that when placed in registry with another screen, the flattened areas define transversely extending passages through which may be slidably and removably inserted their supporting elements. If desired, the latter may be made of magnetizable material and magnetized to extract ferrous particles from the gas or fluid being filtered. Such magnetic supports may either be disposed in vertical alignment with each other through the screen pack or staggered therethrough, depending upon the importance of having such ferrous particles so attracted from the fluid.

The method of pressing at least two sheets of foraminous material with a plurality of raised areas of predetermined width, spaced from each other and extending in a first direction; corrugating said sheets in a second direction transverse to the direction of said raised areas, but excluding the latter, such raised areas being at the level of the apexes of the ridges of the corrugations. The two sheets are then placed one on top of the other with the raised areas in register but disposed most remotely from each other, thereby defining passages between said sheets of said predetermined width and of a depth approximating twice the distance between the apex of a ridge and the bottom of a valley. The elongated elements, such as magnets, may then be inserted into the passages.

By providing a greater diameter for the bands of one roller than for the bands of the other roller, the flat strips may be caused to occur at a level above or below the mean of the corrugations. Desirably, they should occur at the level of one set of peaks of the corrugation. Also the strip areas of the screen which are to be flattened may be pre-stressed by first passing them through a pair of unridged rollers the first of which has annular indentations and the second roller, raised annular portions which mesh with the indentations in the first roller.

When screening so corruated and pressed is cut up into squares or other shapes, and the bottom side of one piece is placed against the bottom side of another with the flattened areas and corrugations in registry, and secured together, the pair of sheets will be seen to provide passages through the corrugations slidably to receive the support bars or magnets. By placing additional pairs of screens upon the first pair and securing them together, as by framing or otherwise, the filter pack of the present invention may be readily constructed.

BRIEF DESCRIPTION OF THE DRAWINGS

FIG. 1 is a perspective but schematic view of a machine to form from rolls of flat screening, corrugated and pressed screening to make filter packs in accordance with the present invention.

FIG. 2 is a perspective view partly in section, of a portion of a filter pack made in accordance with the present invention.

FIG. 3 is an enlarged section taken on the line 3—3 of FIG. 2.

FIG. 4 is an enlarged section taken on the line 4—4 of FIG. 1.

FIG. 5 is a perspective view partly in section of a completed filter pack.

FIG. 6 is a section of an alternative form of filter pack.

FIG. 7 is an elevation, partly broken away, showing a possible use of a filter constructed in accordance with the present invention.

FIG. 8 shows a passageway and support bar of a different configuration than rectangular.

FIG. 9 illustrates a cylindrical screen filter constructed according to the present invention.

DESCRIPTION OF THE PREFERRED EMBODIMENTS

Referring to FIG. 1, screen material 10 on a roll 12 is fed between a first meshing pair of rollers 14 and 16. The roller 14 is provided with a series of annular indentations 14a spaced from each other by a predetermined distance, while the roller 16 has a corresponding series of annular ribs 16a disposed to mesh with the indentations 14a when the rollers 14 and 16 are brought together for rolling contact. By passing through the rollers 14 and 16, the screen material 10 is pre-stretched into a series of strips 22. An adjustable pair of guide elements 17a, 17b serves to hold the advancing screening 10 against lateral wandering as it is next passed between a second pair of rollers 18, 20.

Each of the rollers 18, 20 is provided with a plurality of ribs 19 which are spaced equiangularly about the circumference of the rollers 18, 20 and extend parallel to the roller axes. As the rollers 18, 20 are rotated by a drive (not shown), their respective ribs 19 mesh and produce corrugations 10a in the screen material 10 as it is moved between the meshing rollers 18, 20. However, each rib 19 on the rollers 18, 20 is interrupted by a plurality of annular unribbed bands 18a, 20a respectively, which are spaced from each other by the same distance as the indentations 14a and annular ribs 16a are spaced from each other, and, moreover, are co-aligned therewith. Thus, after the strips 22 are formed in the screen material 10 by being passed between rollers 14, 16, such strips 22 remain uncorrugated as they pass through the rollers 18, 20 by actually moving between unribbed bands 18a, 20a as the rollers 18, 20 are rotated.

In order to retain the strips 22 at the level of the apexes of the corrugations, the diameter of the bands 18a on the roller 18 is made somewhat greater than the diameter of the bands 20a on the roller 20, as illustrated in FIG. 1. Desirably also, one or the other, or both of the shafts 18b, 20b on which the rollers 18, 20 are mounted, are adjustably displaceable with respect to each other, thereby enabling the operator of the machine to vary the depth of the corrugations 10a. The screening as so corrugated with the strips 22 may then be wound upon a second roller 24.

In order to make up a filter pack in accordance with the present invention, the corrugated screening 26 is taken from the roll 24 and cut into suitable lengths and widths or other shape for the particular filter for which it is to be designed. One sheet of the screening 26 is placed on top of a second sheet 26a, but with their flat strips or areas 22 disposed in abutment. Since these flattened areas 22, as mentioned above, are made at the level of the apexes 10b of the corrugations 10a (the screening being designated 26a and b after such flattening and superimposition), when the thus-cut screening 26a and 26b are put together with the flattened areas in registry, it may be seen that each two registering flattened areas defines a passage 28 through the corrugations 10a. These passages 28 may slidably receive bars 30, preferably rigid rectangular in cross section, to provide support for the screening. Such bars 30 may also comprise magnetized elements to attract from the gas or liquid being filtered, ferrous particles entrained in such gas or liquid.

A screen filter pack may be made up by stacking several pairs of the thus-corrugated screen material 26, 26a and securing them in such a stacked arrangement by means of suitable framing 32, as shown in FIG. 5. In the stacking of the screening 26, 26a, with the inserted bars 30, the screening may be assembled with the bars in vertical alignment as shown in FIG. 2, or in staggered alignment as shown in FIG. 6, depending upon the extent to which impediments to the flow of the gas or liquid through the thus-constructed screen pack may be tolerated.

It will also be appreciated that the areas or strips 22 which traverse the corrugations need not necessarily be of the shape which, when disposed oppositely, define a rectangular passage. By modifying the indentations 14a and ribs 16a in the rollers 14 and 16, as well as the unribbed bands 18a, 20a in the rollers 18, 20 respectively, the configuration of the uncorrugated areas or strips 22 may be made arcuate, triangular or of other polygional cross section to permit a bar 30a of a corresponding cross section to be employed.

Further, although the passages 28 may be formed and are available to receive support bars 30, such bars need not necessarily be employed. The areas or strips 22 then serve to permit the screens to be stacked with their corrugations all running in the same direction, a result which is not possible with prior art screening. The latter must either have flat screens interposed between the corrugated layers or the latter alternated in direction of corrugations in order to prevent nesting undesirable compacting of the screening.

Although the foregoing discussion has been directed to corrugated filter packs of a flat stack construction, as may be seen from FIG. 9 , the principles of the invention may equally be applied to constructing filters of other shapes, such as a cylindrical filter.

Screen packs made in the manner herein described and illustrated will be found to be very effective in filtering gases and liquids in that the corrugated layers may be kept at proper spacing from each other and well supported by the bars 30, yet permit the free passage of the gas or fluid through the corrugations 10a of the screening.

When it is desired to clean the screening, the metal bars 30 may be slipped out from the passages 28 and this opens the screening to a greater reverse flow capacity. If the bars 30 are magnetized, their removal from the passages 28 takes with the bars the attracted metallic particles which may then be wiped off or otherwise removed from the magnetized material. To enable this removal to be accomplished, it is desirable to provide slots 33 in the sides 32a and 32b of the framing 32.

A screen filter pack 31, as thus constructed, could be used in the intake of a blower 34 as shown in FIG. 7. However, many other uses of such a filter pack, will readily occur to persons skilled in the art.

I claim:

1. A screen filter pack for filtering liquids, air and other gases containing various pollutants, said filter comprising:
    A. a plurality of separate screen sheets, each sheet being corrugated in a regular pattern of ridges and valleys; at least two of said sheets each having interposed transverse to its corrugations at least one uncorrugated area of a predetermined width extending transversely of the corrugations and disposed at the elevation of the apex of the ridges of the corrugations, one of said at least two sheets with its uncorrugated area in registry with the uncorrugated area of the lower sheet but remote therefrom, thereby providing a passage of said predetermined width between said sheets and extending through the corrugations; and
    B. means to secure said at least two sheets together and against movement relative to each other.

2. A screen filter pack as described in claim 1, wherein there is provided a rigid elongated element having such external configuration and dimensions as to be slidably insertable into, and being inserted in, the said passage and fitting closely therewithin.

3. A screen filter pack as described in claim 2, wherein the rigid elongated element is of magnetizable material and is magnetized to attract to it ferrous particles contained in the liquid, air or other gas being filtered.

4. A screen filter pack for filtering liquids, air and other gases containing various pollutants, said filter comprising:
    A. a plurality of separate screen sheets, each sheet being corrugated in a regular pattern of ridges and valleys and having interposed transversely to its corrugations a plurality of uncorrugated areas spaced from each other, each of said areas being of a predetermined width and at the elevation of the apex of the ridges of the corrugations, one sheet being superimposed upon another sheet with its uncorrugated areas in registry with the uncorrugated areas of the lower sheet but remote therefrom, thereby providing passages of said predetermined width through the corrugations and between said thus-paired sheets, additional pairs of sheets being similarly assembled and superimposed one pair upon another with the corrugations of all said sheets extending in the same direction;

B. means to secure said sheets together and against movement relative to each other; and C. a plurality of rigid elongated elements, each said element having such external configuration and dimensions as to be slidably insertable into, and being inserted in, one of said passages and fitting closely therewithin.

5. The screen filter pack as described in claim 4, wherein each rigid elongated element is of a magnetizable material and is magnetized to attract to it ferrous particles contained in the liquid, air or other gas being filtered.

6. The method of making a filter pack for filtering impurities and other pollutants from a gas or liquid, said method comprising:

A. pressing at least two sheets of foraminous material with a plurality of raised areas of predetermined width, spaced from each other and extending in a first direction;

B. corrugating said sheets in a second direction transverse to the direction of said raised areas, but excluding said areas, said raised areas being at the level of the apexes of the ridges of the corrugations;

C. placing one of said thus-corrugated and raised area sheets on top of the other with the raised areas in registry but disposed most remotely from each other, thereby defining passages between said sheets of said predetermined width and of a depth approximating twice the distance between the apex of a ridge and the bottom of a valley;

D. slidingly inserting rigid elongated elements in said passages; and

E. providing framing for said sheets and elements fixedly to secure them together in the manner in which they have been so assembled.

7. The method as described in claim 6, wherein additional pairs of sheets are similarly corrugated and provided with uncorrugated raised areas, stacked upon each other, provided with rigid elongated elements and secured together as by framing.

* * * * *

UNITED STATES PATENT OFFICE
CERTIFICATE OF CORRECTION

Patent No. 3679057          Dated July 25, 1972

Inventor(s) DAMASO RODOLFO ADELTO PEREZ

It is certified that error appears in the above-identified patent and that said Letters Patent are hereby corrected as shown below:

Please change Inventor's name from "DAMASCO" TO -- DAMASO --. There should be no "C" in that name. Otherwise the name is correct.

Signed and sealed this 30th day of January 1973.

(SEAL)
Attest:

EDWARD M. FLETCHER, JR.　　　　　　　　ROBERT GOTTSCHALK
Attesting Officer　　　　　　　　　　　　Commissioner of Patents

FORM PO-1050 (10-69)